United States Patent

[11] 3,633,154

| [72] | Inventor | Hershey Glantz |
| | | 1401 S.W. 17 Terrace, Miami, Fla. 33156 |
| [21] | Appl. No. | 8,319 |
| [22] | Filed | Feb. 3, 1970 |
| [45] | Patented | Jan. 4, 1972 |

[54] HOUSING FOR BATTERY TERMINALS
1 Claim, 10 Drawing Figs.

[52] U.S. Cl. .................................................. 339/116
[51] Int. Cl. ................................................... H01r 11/26, H01r 13/57
[50] Field of Search .................................... 339/115, 116, 206, 60; 174/92; 136/182, 163

[56] References Cited
UNITED STATES PATENTS
2,052,081   8/1936   Campbell .................... 339/115
2,542,056   2/1951   Ravenscroft ................ 204/286
3,894,056   7/1959   Bogese ......................... 174/92

FOREIGN PATENTS
526,803   3/1954   Belgium ....................... 339/116

Primary Examiner—Richard E. Moore
Attorney—Lloyd J. Andres

ABSTRACT: A plastic housing for enclosing a battery terminal and cable clamp having a sealed passageway for cable entry therethrough including a hinged closure means. A fitting secured to said housing for pressure filling the housing and surrounding the terminal and cable clamp therein with corrosion repellent compound.

PATENTED JAN 4 1972 3,633,154

INVENTOR.
HERSHEY GLANTZ
BY Lloyd Sanders

HOUSING FOR BATTERY TERMINALS

This invention relates in general to a housing for retaining a battery terminal and cable clamp therefor adapted to be filled with corrosion-retardant compound of grease for inhibiting corrosion effects of battery acid.

Prior to this invention, the battery terminal clamps and the ends of the cables attached thereto are normally subject to serious corrosion from the capillary action of the electrolyte from the battery. The corrosion on and around the terminal posts often resulted in a high-resistance connection to the clamp and failure to carry necessary current demands from the battery, as well as the corrosion of near metal parts. The only alternative previous to this invention to maintain proper conductivity and lack of corrosion was frequent manual cleaning and the application of corrosion-resistant compound or greases which procedures do not provide permanent correction of the problem.

The present invention overcomes the above objections and disadvantages by the provision of a plastic-housing means for completely encasing the battery post and the clamp and the end portion of the cable, which casing is filled with a corrosion-retardant compound, which construction is a principal object of the invention.

Another object of the invention is the provision of a housing means which may be adapted to cover ordinary battery posts and cable clamps which provide a hinged cover, permitting unrestricted access to the cable clamp screw means for battery exchange when opened.

These and other objects and advantages in two embodiments of the invention are described and shown in the following specification and drawing, in which.

Figure 1:
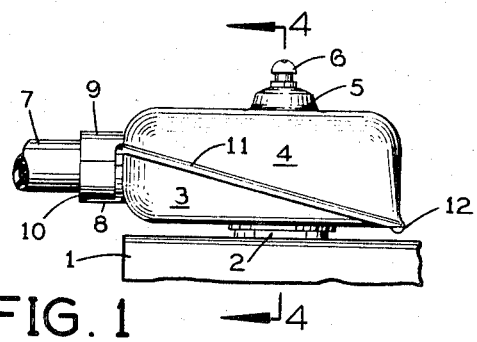
FIG. 1 is a side elevation of the housing applied to a storage battery post.
Figure 2:
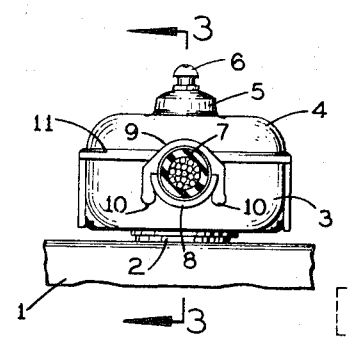
FIG. 2 is a front elevation of the housing shown in FIG. 1.

Referring to FIGS. 1 and 2, a top portion of a typical battery 1 includes a standard battery terminal post 2 projecting upward therefrom which is covered by a molded plastic housing which has a lower portion 3 and a mating upper portion 4 with an integral boss 5 in the top thereof into which is threaded a well-known lubricant-conducting fitting 6 having a small bore therethrough. A large variety of materials are suitable for the housing, such as polyethylene or one of the vinyl compounds.

A typical insulated electric cable 7 enters the housing through a passageway formed by a semicylindrical collar 8 integral with the lower portion 3 of the housing and a mating semicylindrical-shaped collar 9 integral with the upper portion 4 of the housing. The collar 9 has an inwardly canted latch member 10 on each side thereof which normally engages each opposite side of the collar 8 for holding the cover in place.

Figure 4:
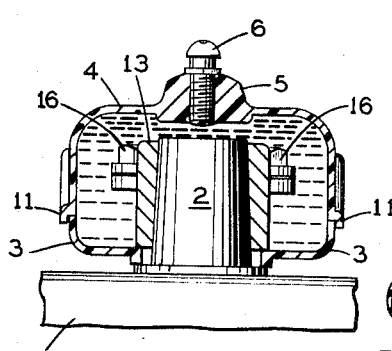
FIG. 4 is an enlarged cross-sectional rear elevation taken through section line 4—4, FIG. 1.

It is to be noted that the upper portion 4 of the housing has an offset flange 11 surrounding same for overlapping a margin of the outer side of the lower portion 3, for rigidizing and sealing the housing, best shown in FIG. 4.

Figure 3:
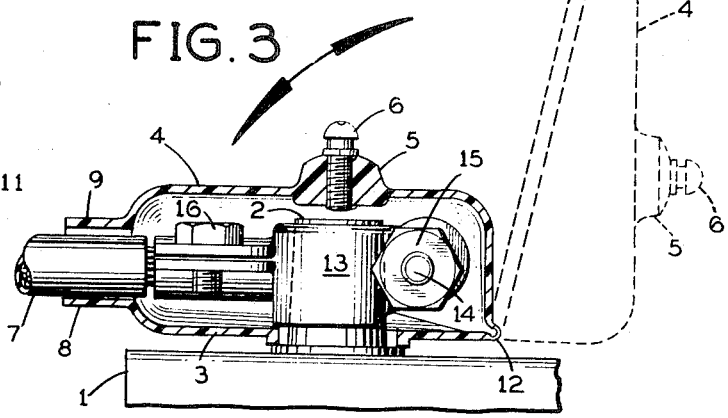
FIG. 3 is an enlarged cross-sectional side elevation taken through section line 3—3, FIG. 2.

FIG. 3 shows an integral hinge 12 along the rear lower edge of the housing, which in this case, is formed by the molding of a reduced thickness area along the junction of the upper and lower portions, permitting flexibility of the area for opening and closing the cover, as illustrated in dotted lines in FIG. 3. When the cover is in closed position, as shown in full lines, it is held by a pair of latch members 10—10, best shown in FIG. 2, which are part of the semicylindrical collar 9.

Figure 5:
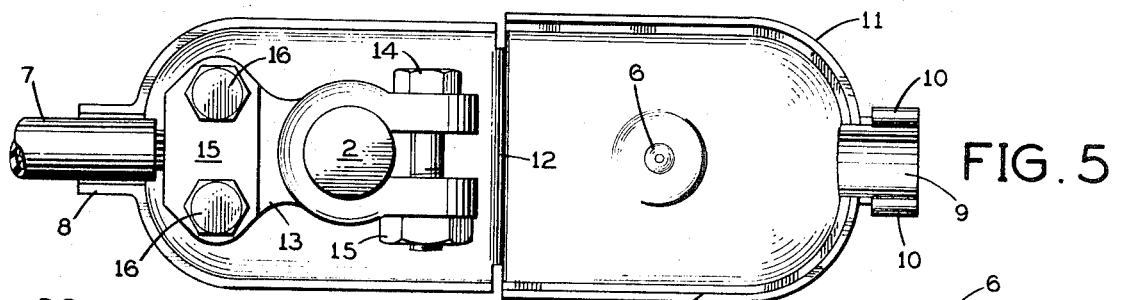
FIG. 5 is an enlarged plan view of the housing shown in FIG. 1 with the cover thereof in open position.

FIG. 5 illustrates a typical cable clamp member 13 for the battery post 2 which is restrained on the post by a bolt 14 and a nut 15. This particular clamp member 13, shown, also secures the cable 7 by a strap retained by screws 16—16.

It is apparent that well-known clamps for post 2 include those having a bore in which the cable is soldered rather than held by a separate strap and screws 16—16, as shown.

Figures 6, 7, 9:
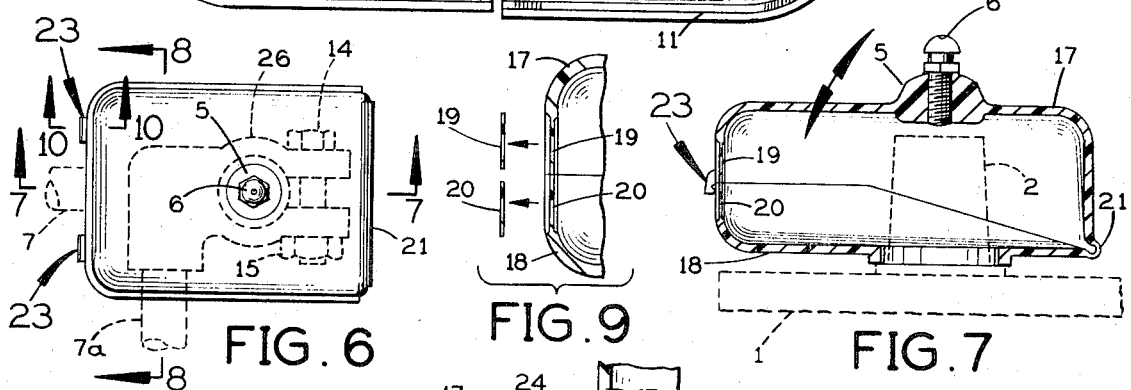
FIG. 6 illustrates a universal-type housing alternate to that shown in FIG. 1.
FIG. 7 is an enlarged cross-sectional side view taken through section line 7—7, FIG. 6.
FIG. 9 is a fragmentary top view of each of the two knockout elements forming alternate cable entrances, illustrated in dotted lines in FIG. 6.

FIG. 6–10 show a corrosion-preventive housing substantially the same as shown in FIGS. 1–5 except the upper portion 17 and the lower portion 18 are provided with integral thin semicircular section knockouts 19 and 20, shown in FIG. 9, molded in upper and lower portions 17 and 18, respectively. The upper and lower portions are hinged by an integral thin-wall hinge 21, as shown in FIG. 3. The alternate housing also includes a flange 22 integral with the upper portion 17 for overlapping a margin of the outer sides of the lower portion 18.

Figures 8, 10:
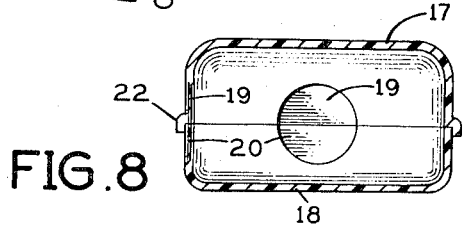
FIG. 8 is a cross-sectional rear end elevation taken through section line 8—8, FIG. 6.
FIG. 10 is an enlarged cross-sectional view taken through section line 10—10, FIG. 6.

Referring to FIG. 7, the upper and lower portions 17 and 18 are secured together in their closed relation by a pair of spaced integral latch means 23, shown in FIGS. 6 and 7, each of which comprises an integral notched arm 24 and a mating abutment 25, shown in FIG. 10.

FIG. 6 illustrates in dotted lines a cable clamp 26 which retains the cable 7a soldered in a bore therein, which enters a circular hole, with knockouts removed, midway between the upper and lower portions of the housing.

FIG. 6 also shows the cable entering the housing from the front end thereof following the removal of a corresponding pair of knockouts.

It is to be noted that the upper and lower portions of the housing have an oblique junction sloping toward the hinge 21 to provide free access to the bolt 14 and the nut 15 for convenient exchange of batteries.

In operation and when the housing is secured in closed position, as shown in FIG. 1, then the entire inner space of the housing is filled with corrosive-resistant compound or grease by pressure injection through the well-known fitting 6 with a well-known lubrication gun. The thick layer of compound or grease surrounding the battery post, cable clamp, and the end portion of the cable will preserve a good electrical contact between the clamp member and the post 2 as well as preventing corrosion of other parts remote from the post 2.

This invention comprehends modifications in construction that come within the teachings and spirit of the above specification.

Having described my invention, I claim:

1. A corrosion-inhibiting enclosure for a battery terminal comprising a lower housing member of plastic material with an entry through the bottom thereof for sealing a battery terminal therethrough including a semicylindrical opening through one end thereof for receiving an insulated electric cable terminating in a cable connector of the bolt-nut-clamp type for clamping said terminal, a cover member of said plastic material having a closure junction with a surrounding overhanging flange for sealing same on said lower housing member including a semicylindrical opening at one end thereof in mating relation to said cable opening in said lower housing member forming a cylindrical cable entry into said enclosure, a straight elongated hinge means of uniform curvilinear cross-sectional shape integral with the lower corner of said lower housing member and the lower edge of said cover member with said hinge means a predetermined thickness less than the thickness of said lower housing member and said cover member, said closure junction extending from said opposite ends of said hinge means in an angular direction upward to substantially the center of the opposite end of said enclosure to said openings, and a fitting through said cover means for conducting pressurized grease therethrough for filling the space in said enclosure not occupied by said terminal and said cable and said bolt-nut-clamp type connector.

* * * * *